United States Patent [19]

Hahn et al.

[11] Patent Number: 4,778,343
[45] Date of Patent: Oct. 18, 1988

[54] ROTOR STRUCTURE, ESPECIALLY FOR A ROTARY WING AIRCRAFT

[75] Inventors: Michael Hahn, Ottobrunn; Gerald Kuntze-Fechner, Bad Wiessee, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 102,387

[22] Filed: Sep. 29, 1987

[30] Foreign Application Priority Data

Oct. 1, 1986 [DE] Fed. Rep. of Germany ....... 3633346

[51] Int. Cl.⁴ .................................................. B64C 27/35
[52] U.S. Cl. ............................ 416/134 A; 416/140; 416/141; 416/138
[58] Field of Search ............. 416/114, 138 A, 140 A, 416/141, 170 B, 174 C, 244 D, 245 C, 134 A

[56] References Cited

U.S. PATENT DOCUMENTS

| | | | |
|---|---|---|---|
| 4,087,203 | 5/1978 | Ferris | 416/138 A X |
| 4,332,525 | 6/1982 | Cheney | 416/134 A |
| 4,381,902 | 5/1983 | Head et al. | 416/134 A |
| 4,427,340 | 1/1984 | Metzger et al. | 416/134 A X |
| 4,547,127 | 10/1985 | Frommlet et al. | 416/134 A |
| 4,592,701 | 6/1986 | Hahn et al. | 416/138 A X |
| 4,676,720 | 6/1987 | Niwa et al. | 416/134 A |
| 4,690,615 | 9/1987 | Kuntze-Fechner et al. | 416/134 A |
| 4,690,616 | 9/1987 | Hahn et al. | 416/134 A |

FOREIGN PATENT DOCUMENTS

| | | | |
|---|---|---|---|
| 85129 | 8/1983 | European Pat. Off. | 416/134 A |
| 3526470 | 7/1985 | Fed. Rep. of Germany. | |
| 2457417 | 1/1981 | France | 416/138 A |

*Primary Examiner*—Everette A. Powell, Jr.
*Attorney, Agent, or Firm*—W. G. Fasse; D. H. Kane, Jr.

[57] ABSTRACT

In order to avoid a negative coupling between blade lead-lag movements and blade angle adjustment movements in a helicopter rotor, the angle ($\beta$) between a control rod (5) for the blade angle adjustment and an effective damping plane (M) of the rotor is increased as compared to the respective angle in conventional rotors. This increase of the angle ($\beta$) is accomplished by arranging a damping device (9) having the effective plane (M) for suppressing blade lead-lag movements in such a way on a blade angle control sleeve (4), that the effective plane (M) of the damping device (9) encloses an angle ($\alpha$) with the lead-lag plane of the rotor.

5 Claims, 2 Drawing Sheets

ROTOR STRUCTURE, ESPECIALLY FOR A ROTARY WING AIRCRAFT

FIELD OF THE INVENTION

The invention relates to a rotor structure, especially for a rotary wing aircraft such as a helicopter. A helicopter rotor has one or more rotor blades, each comprising a radially outer blade wing section, an intermediate blade neck, and a blade root operatively connected to a rotor hub.

DESCRIPTION OF THE PRIOR ART

German patent (DE-PS) No. 3,526,470 corresponding to U.S. Pat. No. 4,690,616 (Hahn et al) relates to a rotor structure of the above type. In the known rotor structure the support of the blade pitch angle control sleeve at its radially inner connecting end, on the blade root is accomplished with a strut which extends out of the blade pitch angle control sleeve and through a damping device or damping devices for damping blade lead-lag movements. This structure permits placing the damping device or damping devices in a location which is exposed to an airstream outside of the pitch angle control sleeve. Such an arrangement has several advantages. First, the airstream necessarily cools the damping device, thus preventing an unpermissible heat-up of the lead-lag damping device. Second, the strut can be constructed as a tensioning means for the damping device. However, there is room for further improvement for avoiding a so-called negative coupling of the blade lead-lag movements with blade pitch angle adjustment movements. It is difficult to avoid such negative coupling in the prior art due to the vertical connection of the blade pitch angle control sleeve by the strut to the damping device, especially in those instances where a swash or wobble plate of small diameter is used which enforces a slanted position of the blade pitch angle adjustment rod. Such negative coupling causes a rotor blade to lift its leading edge during a lead movement in the rotational direction of the rotor, thereby changing the blade pitch angle. Similarly during a lag movement in the direction opposite to the rotational direction of the rotor, the leading edge of the blade is turned downwardly again changing the pitch angle in an undesirable manner. Such a negative coupling reduces the effectiveness of the lead-lag damping device or devices.

OBJECTS OF THE INVENTION

In view of the foregoing it is the aim of the invention to achieve the following objects singly or in combination:

to improve a rotor of the above type in such a manner that the mentioned negative coupling is avoided, even if the blade pitch angle adjustment rod assumes a slanted position relative to the rotational axis of the rotor; and to locate the lead-lag damping device in a position in which it will be most effective for its intended purpose.

SUMMARY OF THE INVENTION

The above objects have been achieved by providing an angle ($\alpha$) between the single effective plane of the lead-lag damping device or devices and the blade lead-lag movement plane. Such an angle ($\alpha$) is not present in prior art devices in which the single effective plane of the lead-lag damping device extends in parallel to the lead-lag plane. According to the invention the tilting of the single effective plane relative to the lead-lag plane by the angle ($\alpha$) simultaneously increases an angle ($\beta$) enclosed by the longitudinal axis of the pitch angle control rod and the single effective plane of the damping device. This single effective plane of the damping device also becomes the central plane of the pitch angle control sleeve, which is preferably twisted to obtain said tilting of the single effective plane.

The invention is based on the recognition that a coupling of the blade lead-lag movement and of the pitch angle adjustment movements need not necessarily lead to a negative influence of the lead-lag damping. The invention has further recognized that the influence on the lead-lag damping device depends on the position of the damping device, more specifically the position of its effective plane relative to the lead-lag plane. Due to the connection of the damping device to the blade pitch angle control sleeve, the damping device necessarily functions as a guide of the movement of the blade pitch angle control sleeve. Due to this guiding the blade pitch angle control sleeve is forced to perform a tilting movement at an angle to the rotational plane of the rotor or to the lead-lag plane of the rotor. It has been found that due to this tilting movement of the blade pitch angle control sleeve the coupling between the lead-lag movements and the pitch angle adjustment movements has been eliminated. In fact, depending on the angle of the inclination of the effective plane of the damping device relative to the blade lead-lag plane, it is possible to achieve an increase in the damping effectiveness, in other words, to achieve a positive coupling of the pitch angle adjusment movement and the lead-lag movement. The angle of inclination of the effective plane of the damping device relative to the lead-lag plane is referred to herein as the angle ($\alpha$) and this angle is so selected in a preferred embodiment that an angle ($\beta$) is assured between the longitudinal axis of the pitch angle control rod and the effective plane of the damping device which is at least about 90° during hovering flight.

The invention may be realized in a very economical way by providing the blade pitch angle control sleeve with a twisted intermediate section between its radially outer and radially inner connecting sections.

An especially effective avoidance of the negative coupling is achieved when the journal axis of the pitch control rod is located slightly below the effective plane of the lead-lag damping device. However, this journal axis may also be located in the effective plane of the lead-lag damping device.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
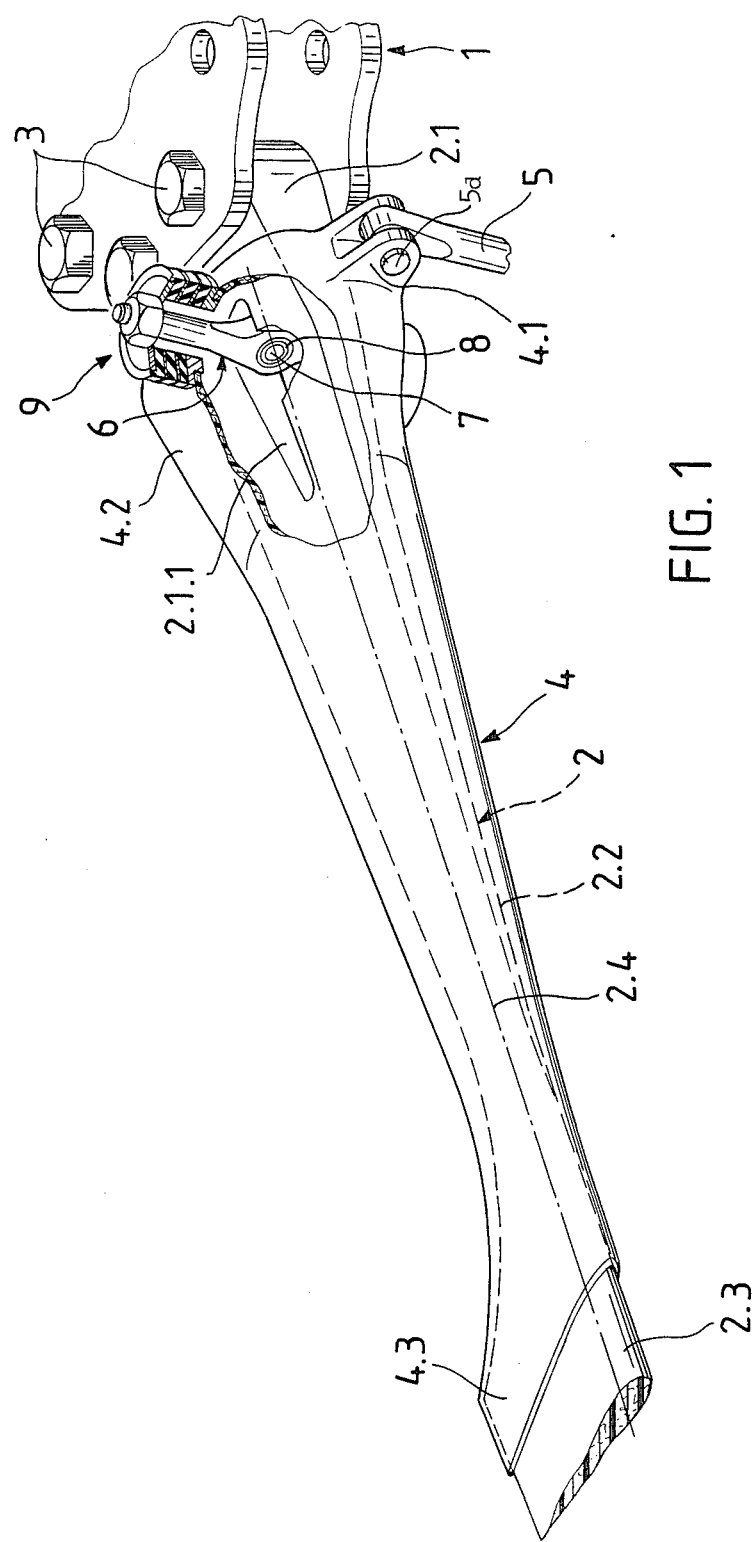
FIG. 1 is a perspective view of a portion of a helicopter rotor according to the invention partially broken away.

Referring to FIG. 1, the rotor of a rotary wing aircraft has a rotor hub 1 and a plurality of rotor blades 2, for example, made of fiber reinforced composite material. Each rotor blade has a radially outer wing section 2.3, an intermediate blade neck section 2.2, and a blade root section 2.1 operatively connected to the rotor hub 1 by nuts and bolts 3 as is conventional. This type of connection of the blade root 2.1 to the hub 1 results in a so-called rigid blade connection. In order to achieve the required blade pitch angle adjustments of the wing section 2.3 about the longitudinal blade axis 2.4, the blade neck section 2.2 is constructed to be soft or yielding relative to torque moments about the longitudinal, radial axis 2.4. This desired torsional yielding of the blade neck section 2.2 is achieved by making this section relatively long and by using unidirectional fiber strands in the blade neck section, whereby the strands extend in parallel to the radial axis 2.4.

Due to the relative flexibility of the blade neck section 2.2, this section is enclosed by a blade pitch angle adjustment control sleeve 4 which is constructed to be stiff relative to torque moments so that such adjustment torque moments can be transmitted through the sleeve 4 to the wing section 2.3. For this purpose the sleeve 4 is rigidly connected with its radially outer end 4.3 to the wing section 2.3. Between the radially outer end 4.3 and the radially inner end 4.2 the sleeve 4 is spaced from the blade neck section 2.2. The pitch angle adjustment movements are introduced into the sleeve 4 at its radially inner end 4.2 through a lever section 4.1 and through a control rod 5 journalled to the lever 4.1 by a journal bolt 5d.

A connection between the blade root 2.1 and the control sleeve 4 that would permit merely transmitting rotational or angular movements would be insufficient because feedback effects into the control sleeve 4 due to bending movements of the torsion soft blade neck section 2.2, due to blade longitudinal expanions, due to blade flapping movements, and due to blade load-lag movements, must be taken into account. Thus, the connection between the blade root 2.1 and the control sleeve 4 must be capable of permitting all these relative movements including longitudinal movements in the direction of the radial axis 2.4. Thus, in order to accommodate these movements, there is provided, for example, a bearing pin 7 in an aperture 2.1.1 of the blade root 2.1. This bearing pin 7 is connected through an elastomeric bearing 8 to a double armed strut 6 having two arms 6.1. The bearing pin 7 extends coaxially to the radial longitudinal axis 2.4 and the elastomeric bearing 8 is longitudinally movable along the bearing pin 7.

Figure 2:
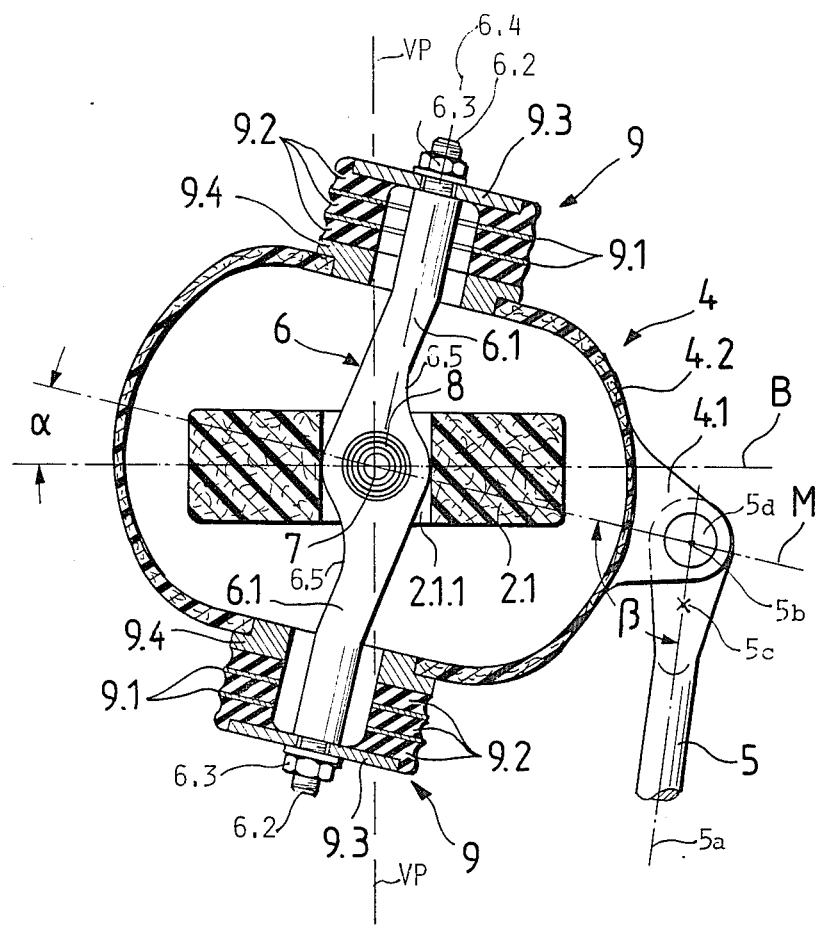
FIG. 2 is a sectional view through the blade root, through the damping device, and through the blade pitch angle control sleeve to illustrate the blade control means.

The outer ends of the strut arms 6.1 are provided with threads 6.2 for connecting the radially inner connecting section 4.2 of the control sleeve 4 to the strut 6 and thus to the blade root 2.1 through, for example, two damping devices 9. These damping devices are provided to avoid unstable vibrations or oscillations of the rotor blade 2 that might otherwise result due to the longitudinal construction of the torsion-soft blade neck 2.2, particularly during a rotor start-up or during a rotor slow-down. Each damping device is connected to the radially inner connecting section 4.2 of the control sleeve 4 as will now be described. According to the invention the control sleeve 4 has a longitudinal twist around the longitudinal radial axis 2.4 so that the damping devices 9 have an effective plane M which does not extend anymore in parallel to the lead-lag plane B shown in FIG. 2, but rather extends at an angle $\alpha$ relative to the lead-lag plane B. Accordingly, the longitudinal axis 6.4 of the strut 6 also extends at the same angle $\alpha$ relative to a plane VP which in turn extends perpendicularly to the lead-lag plane B as shown in FIG. 2. In a lift rotor the plane VP will be a vertical plane, however, in a tail rotor the plane VP will be a horizontal plane. The so positioned damping devices 9 are still in the cooling airstream as in the prior art, but are now enabled to avoid the above mentioned negative coupling.

Each damping device 9 comprises stiff intermediate washers 9.1 between elastomeric layers 9.2 for example made of polyurethane and having a high damping ability. The so-formed stack is held in place between two mounting plates 9.3 and 9.4. The mounting plate 9.4 has a flange and a reduced diameter portion received in a respective recess in the radially inner connecting section 4.2 of the control sleeve 4 so that the flange rests on the surface of the section 4.2. The two damping devices 9 are arranged symmetrically relative to each other and relative to their single effective plane M. This effective plane M is simultaneously the central plane of the sleeve 4. In other words, both damping devices 9 have the same effective plane M or the same effective direction. The damping devices 9 are held in place by nuts 6.3 on the threads 6.2 of each strut arm 6.1. A washer may be inserted between the outer cover plate 9.3 and the nut 6.3. Each damping device 9 has an inner hole through which the respective arm 6.1 of the strut 6 passes with a spacing all around the strut arm 6.1, except in the outer cover plate 9.3. This spacing, except in the outer cover plate 9.3, is such that the outer cover plate 9.3 is displaceable relative to the inner cover plate 9.4. This spacing permits a displacement to the extent determined by the deformability of the damping device 9. Thus, the blade wing section 2.3 can displace the outer cover plate 9.3 relative to the inner cover plate 9.4 through the control sleeve 4 in accordance with the maximal obtainable damping effect of the layers 9.2. For this purpose, the inner portion of the cover plate 9.4 reaches into a respective opening in the sleeve 4 as mentioned above.

Due to the positioning of the damping device 9 as a connecting means between the pitch angle control sleeve 4 and the respective strut arm 6.1, a coupling between the blade lead-lag movements and the blade angle ajustment movements must be taken into account. This has been done according to the invention, as shown especially in FIG. 2 in order to avoid a reduction in the damping effect of the damping devices 9 by providing the angle $\alpha$ between the lead-lag plane B and the single effective plane M. The angle $\alpha$ is so selected that it causes an increase of the angle $\beta$ between the longitudinal axis 5a of the control rod 5 and the effective plane M. As mentioned, the angle $\beta$ should be at least about 90°, whereby in the critical flight situation of a hovering flight the negative coupling is avoided with certainty. This is so even in those instances where, due to the use of a small diameter wobbling plate, the longitudinal axis 5a of the control rod 5 extends at a slant relative to the rotational axis of the rotor Depending on the size of the angle $\alpha$ which is so selected that the angle $\beta$ is at least 90°, it is possible to even accomplish a positive coupling between the blade lead-lag movements and the blade angle adjustment movements, whereby the damping effect is even increased. This desirable feature can even be improved by locating the journal 5d somewhat below the effective plane M as shown at 5c rather than locating this journal 5d in the plane M as shown at 5b.

By providing the control sleeve 4 with a twisted profile between its connecting ends, the inclination of the effective plane M is compensated. It has been found that such twisted profile does not impair the movability of the strut 6 which, due to this angle α is also inclined by the same angle with its longitudinal axis 6.4 relative to the vertical plane VP especially if each arm 6.1 of the strut is provided with a bend 6.5 at which the cross-sectional area of the strut 6 is reduced toward the outer ends of the strut arms 6.1.

Although the invention has been described with reference to specific example embodiments, it will be appreciated, that it is intended to cover all modifications and equivalents within the scope of the appended claims.

What we claim is:

1. A rotor structure, especially for rotary wing aircraft, comprising a rotor hub and one or more rotor blades defining a lead-lag plane (B), each blade having a blade root, a blade neck, a blade wing section, and a blade pitch angle control sleeve, said blade neck being torsionally yielding for allowing a blade pitch angle adjustment movement, said blade neck being arranged between said blade root and said blade wing section, means connecting each rotor blade root to said rotor hub, said control sleeve being torsionally stiff for transmitting blade pitch angle adjustment forces to said wing section, said blade pitch angle control sleeve extending essentially coaxially along but without contacting said blade neck, a radially outer end of said blade pitch angle control sleeve being rigidly connected to said blade wing section, two-armed support strut means for securing a radially inner end of said blade pitch angle control sleeve to said blade root in a movable manner relative to said blade root, a blade pitch angle adjustment rod (5) having a longitudinal axis, means journalling said blade pitch angle adjustment rod to said blade pitch angle control sleeve, damping means arranged between said strut means and said blade pitch angle control sleeve for damping a blade lead-lag movement, said damping means having a single effective plane (M) which is angularly tilted by an angle (α) relative to said lead-lag plane (B), so that said angle (α) causes an increase in an angle (β) enclosed between said longitudinal axis of said blade pitch angle adjustment rod and said single effective plane (M) of said damping means.

2. The rotor structure of claim 1, wherein said blade pitch angle control sleeve has a radially outer connecting section (4.3) rigidly connected to said blade wing section, a radially inner connecting section (4.2) connected to said strut means through said damping means (9), said radially inner connecting section (4.2) being angularly displaced by said angle (α) relative to said vertical plane, said pitch angle control sleeve further comprising an intermediate section between said connecting sections (4.2 and 4.3), said intermediate section having a twisted profile for securing said angularly displaced connecting section to said radially outer connecting section which is not angularly displaced.

3. The rotor structure of claim 1, wherein said angle (α) is large enough to assure that said angle (β) is at least about 90° when said aircraft is in a hovering flight pattern.

4. The rotor structure of claim 1, wherein said blade pitch angle control sleeve has a radially inner connecting end (4.2) which is angularly twisted relative to its radially outer end, and wherein said means (5d) journalling said blade pitch angle adjustment rod (5) to said blade pitch angle control sleeve, are connected to said radially inner connecting end of said blade pitch angle control sleeve at an intersection (5b) of said single effective plane (M) and said longitudinal axis (5a) of said blade pitch angle adjustment rod (5).

5. The rotor structure of claim 1, wherein said blade pitch angle control sleeve has a radially inner connecting end (4.2) which is angularly twisted relative to its radially outer end, and wherein said means (5d) journalling said blade pitch angle adjustment rod (5) are connected (at 5c) to said radially inner connecting end (4.2) below said single effective plane (M).

* * * * *